United States Patent
He et al.

(10) Patent No.: US 9,092,667 B2
(45) Date of Patent: Jul. 28, 2015

(54) ARRANGEMENT FOR AND METHOD OF READING FORMS IN CORRECT ORIENTATION BY IMAGE CAPTURE

(75) Inventors: Duanfeng He, South Setauket, NY (US); Anu Kannan, New York, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 471 days.

(21) Appl. No.: 13/594,924

(22) Filed: Aug. 27, 2012

(65) Prior Publication Data

US 2014/0059414 A1    Feb. 27, 2014

(51) Int. Cl.
| | | |
|---|---|---|
| G06K 7/10 | (2006.01) | |
| G06K 9/00 | (2006.01) | |
| G06K 9/22 | (2006.01) | |
| G06K 9/32 | (2006.01) | |

(52) U.S. Cl.
CPC ............ G06K 9/00449 (2013.01); G06K 9/228 (2013.01); G06K 9/3208 (2013.01)

(58) Field of Classification Search
CPC   G06K 7/0016; G06K 7/10881; G06K 7/1417
USPC ............................ 235/472.01, 462.09, 462.45
See application file for complete search history.

(56) References Cited

U.S. PATENT DOCUMENTS

| | | | |
|---|---|---|---|
| 2,922,893 A | 1/1960 | Ett | |
| 5,031,225 A | 7/1991 | Tachikawa et al. | |
| 5,235,651 A | 8/1993 | Nafarich | |
| 5,383,754 A | 1/1995 | Sumida et al. | |
| 5,471,549 A | 11/1995 | Kurosu et al. | |
| 5,592,572 A | 1/1997 | Le | |
| 6,137,905 A | 10/2000 | Takaoka | |
| 6,148,119 A | 11/2000 | Takaoka | |
| 6,169,822 B1 | 1/2001 | Jung | |
| 6,567,628 B1 | 5/2003 | Guillemin et al. | |
| 6,633,655 B1 * | 10/2003 | Hong et al. | 382/118 |
| 6,816,630 B1 * | 11/2004 | Werth et al. | 382/287 |

(Continued)

FOREIGN PATENT DOCUMENTS

| | | |
|---|---|---|
| EP | 1580662 A2 | 9/2005 |
| EP | 2178028 A2 | 4/2010 |
| WO | 2006010019 A2 | 1/2006 |

OTHER PUBLICATIONS

L. V. Rasmussen et al: "Development of an Optical Character Recognition Pipeline for Handwritten form Fields from an Electronic Health Record", Journal of the American Medical Informatics Association, vol. 19, No. el, Sep. 2, 2011, pp. e90-e95, XP055094613, ISSN: 1067-5027.

(Continued)

*Primary Examiner* — Daniel St Cyr
(74) *Attorney, Agent, or Firm* — Nong-Qiang Fan

(57) ABSTRACT

An arrangement for, and a method of, electro-optically reading forms, each form having a plurality of form fields arranged at locations relative to one another, by image capture, includes storing form templates, each template having a plurality of template fields arranged at locations relative to one another, and capturing images over a field of view. A form and a correct orientation of the form, whose image is being captured, are automatically identified by matching the locations of the form fields in the captured image of the form with the locations of the stored template fields. The form fields on the identified form in the correct orientation are thereupon processed.

18 Claims, 5 Drawing Sheets

(56) References Cited

U.S. PATENT DOCUMENTS

| | | |
|---|---|---|
| 2004/0081332 A1* | 4/2004 | Tuttle et al. .................. 382/100 |
| 2006/0264941 A1 | 11/2006 | Lins |
| 2007/0078560 A1 | 4/2007 | Jones et al. |
| 2007/0280406 A1 | 12/2007 | Gellebter |
| 2009/0214125 A1 | 8/2009 | Okumura |
| 2010/0019041 A1 | 1/2010 | McCormick |
| 2010/0188244 A1 | 7/2010 | Sattler et al. |
| 2010/0226533 A1* | 9/2010 | Bharath et al. ................ 382/103 |
| 2011/0091109 A1 | 4/2011 | Zuev et al. |
| 2011/0243477 A1 | 10/2011 | Minerich |

OTHER PUBLICATIONS

International Search Report and Written Opinion mailed Jan. 13, 2014 in counterpart PCT application No. PCT/US2013/053154.

* cited by examiner

ARRANGEMENT FOR AND METHOD OF READING FORMS IN CORRECT ORIENTATION BY IMAGE CAPTURE

FIELD OF THE DISCLOSURE

The present disclosure relates generally to an arrangement for, and a method of, electro-optically reading forms by image capture, by automatically identifying a form and a correct orientation of the form whose image is being captured, by matching locations of form fields in the captured image of the form with locations of stored template fields.

BACKGROUND

Solid-state imaging systems or imaging readers have been used, in both handheld and/or hands-free modes of operation, to electro-optically read targets, such as one- and/or two-dimensional bar code symbols, each bearing elements, e.g., bars and spaces, of different widths and reflectivities, to be decoded, as well as forms, such as documents, labels, receipts, signatures, drivers' licenses, identification badges, and payment/loyalty cards, each bearing one or more form fields, typically containing alphanumeric characters, or images, or bar code symbols.

A known exemplary imaging reader includes a housing either held by a user and/or supported on a support surface, a window supported by the housing and aimed at the target, and an imaging engine or module supported by the housing and having a solid-state imager (or image sensor) with a sensor array of photocells or light sensors (also known as pixels), and an imaging lens assembly for capturing return light scattered and/or reflected from the target being imaged along an imaging axis through the window over a field of view, and for projecting the return light onto the sensor array to initiate capture of an image of the target over a range of working distances in which the target can be read. Such an imager may include a one- or two-dimensional charge coupled device (CCD) or a complementary metal oxide semiconductor (CMOS) device and associated circuits for producing and processing electrical signals corresponding to a one- or two-dimensional array of pixel data over the field of view. These electrical signals are decoded and/or processed by a programmed microprocessor or controller into information related to the target being read, e.g., decoded data indicative of a symbol, or characters or marks indicative of text in a form field of a form, or into a picture indicative of a picture on the form. A trigger is typically manually activated by the user to initiate reading in a handheld mode of operation. Sometimes, an object sensing assembly is employed to automatically initiate reading whenever a target enters the field of view in a hands-free mode of operation.

In the hands-free mode, the user may slide or swipe the target past the window in either horizontal and/or vertical and/or diagonal directions in a "swipe" mode. Alternatively, the user may present the target to an approximate central region of the window in a "presentation" mode. The choice depends on the type of target, operator preference, or on the layout of a workstation in which the reader is used. In the handheld mode, the user holds the reader in his or her hand at a certain distance from the target to be imaged and initially aims the reader at the target. The user may first lift the reader from a countertop or a support stand or cradle. Once reading is completed, the user may return the reader to the countertop or to the support stand to resume hands-free operation.

Although the known imaging readers are generally satisfactory for their intended purpose, one concern relates to reading different types of targets during a reading session. In a typical reading session, a majority of the targets are symbols, and a minority of the targets are forms that contain form fields, each containing text, or a picture, or a symbol, arranged at various locations on each form. There may be different types of forms of different, or the same, size. The known imaging readers require that the user must configure the reader to read each form prior to trigger activation. This configuring is typically done by having the user scan one or more configuration bar code symbols with the imaging reader during a calibration mode of operation, or by interacting the imaging reader with a host computer interface in which a host computer instructs the imaging reader to change its configuration, such that the microprocessor is taught to recognize a certain form. However, this advance configuring is a cumbersome process and requires the user to remember to select, and to switch to, the correct form prior to trigger activation.

Another concern relates to reading forms in a correct orientation. Forms are generally not omnidirectional. In a handheld reader, the user is required to rotate the form to a particular orientation. For example, a driver's license may have the same physical size as an employee badge, but the form fields of the driver's license are best read in a landscape orientation, while the form fields of the employee badge are best read in a portrait orientation.

In the prior art of hands-free readers, such as flatbed scanners, photocopiers, fax machines, and like fixed equipment, orientation detection is typically performed by optical character recognition (OCR). The forms are presented on a flat surface of the equipment, and at least one edge of the form is aligned with the equipment, in one of four directions. Typically, an OCR engine is given the same form, or parts of the form, in four separate directions. The direction (orientation) that correctly decodes the most number of characters, or decodes them with the highest confidence, is assumed to be correct. The orientations thus gotten from several different form fields may be combined to make a final decision for the correct orientation of the form. However, the OCR approach is generally slow. Performing OCR on a form imaged with an arbitrary rotation typically requires that the image may need to be rectified first, thereby causing further delays.

Orientation detection can also be performed by employing orientation marks. However, some forms may or may not come with these marks, and customization for this task alone may not be desirable. For example, if a merchant wants to scan the front of drivers' licenses for verification of the information (e.g., in comparison with the encoded information on the back of the drivers' licenses to prevent fraud), or to capture the picture on the licenses (which are not available as encoded information on the back), the merchant may not be able to affix orientation marks on the licenses. Margin detection can also be employed, but it only works if a form is known to contain significantly asymmetrical margins, such as printed material prepared for binding. However, not all forms have significantly asymmetrical margins.

Accordingly, there is a need to provide an arrangement for, and a method of, electro-optically reading forms by image capture, by automatically identifying each form in a streamlined fashion, and by automatically identifying a correct orientation of each form whose image is being captured, without performing advance OCR or requiring orientation marks.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
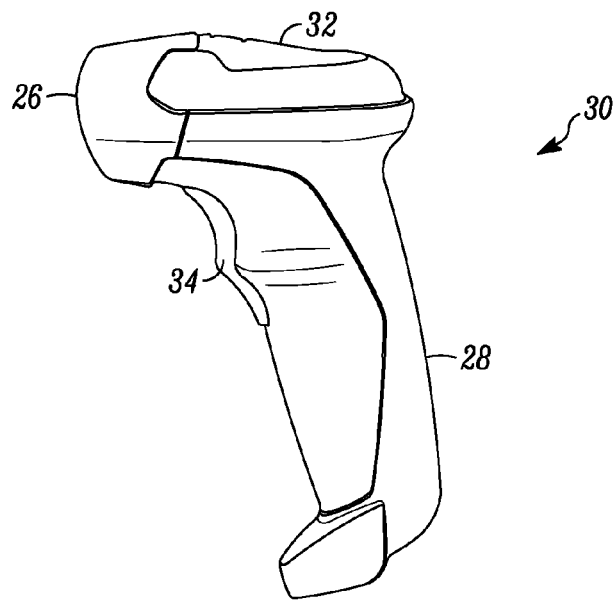
FIG. 1 is a side elevational view of a handheld imaging reader operative for capturing images from targets to be electro-optically read in accordance with this invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The arrangement and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One feature of this invention resides, briefly stated, in an arrangement for electro-optically reading forms, each form having a plurality of form fields arranged at locations relative to one another, by image capture. The arrangement includes a housing; a memory for storing form templates, each template having a plurality of template fields arranged at locations relative to one another; an imaging assembly supported by the housing for capturing images over a field of view; and a controller operative for automatically identifying a form and a correct orientation of the form whose image is being captured by the imaging assembly, by matching the locations of the form fields in the captured image of the form with the locations of the stored template fields. The controller is further operative for processing the form fields on the identified form in the correct orientation.

The controller determines a size and a location of the form, and identifies a size and the location of each of the form fields in the captured image of the form. The controller separately processes data in each form field, e.g., by applying one of optical character recognition (OCR), optical mark recognition (OMR), and intelligent character recognition (ICR) to the data. The controller turns the captured image when the locations of the form fields in the captured image do not match the locations of the stored template fields.

In a preferred embodiment, the imaging assembly advantageously includes a solid-state imager having an array of image sensors, preferably, a CCD or a CMOS array, and at least one imaging lens for focusing the captured image onto the array. A trigger is supported by the housing, for activating the reading. The controller is operative for automatically distinguishing between the forms in response to activation by the trigger.

In accordance with another aspect of this invention, a method of electro-optically reading forms, each form having a plurality of form fields arranged at locations relative to one another, by image capture, is performed by storing form templates, each template having a plurality of template fields arranged at locations relative to one another, by capturing images over a field of view, by automatically identifying a form and a correct orientation of the form whose image is being captured, by matching the locations of the form fields in the captured image of the form with the locations of the stored template fields, and by processing the form fields on the identified form in the correct orientation.

Reference numeral 30 in FIG. 1 generally identifies an ergonomic imaging reader configured as a gun-shaped housing having an upper barrel or body 32 and a lower handle 28 tilted rearwardly away from the body 32 at an angle of inclination, for example, fifteen degrees, relative to the vertical. A window 26 is located adjacent the front or nose of the body 32 and is preferably also tilted relative to the vertical. The imaging reader 30 is held in an operator's hand and used in a handheld mode in which a trigger 34 is manually depressed to initiate imaging of targets, especially symbols and/or forms, to be read in a range of working distances relative to the window 26. Housings of other configurations can also be employed.

Figure 2:
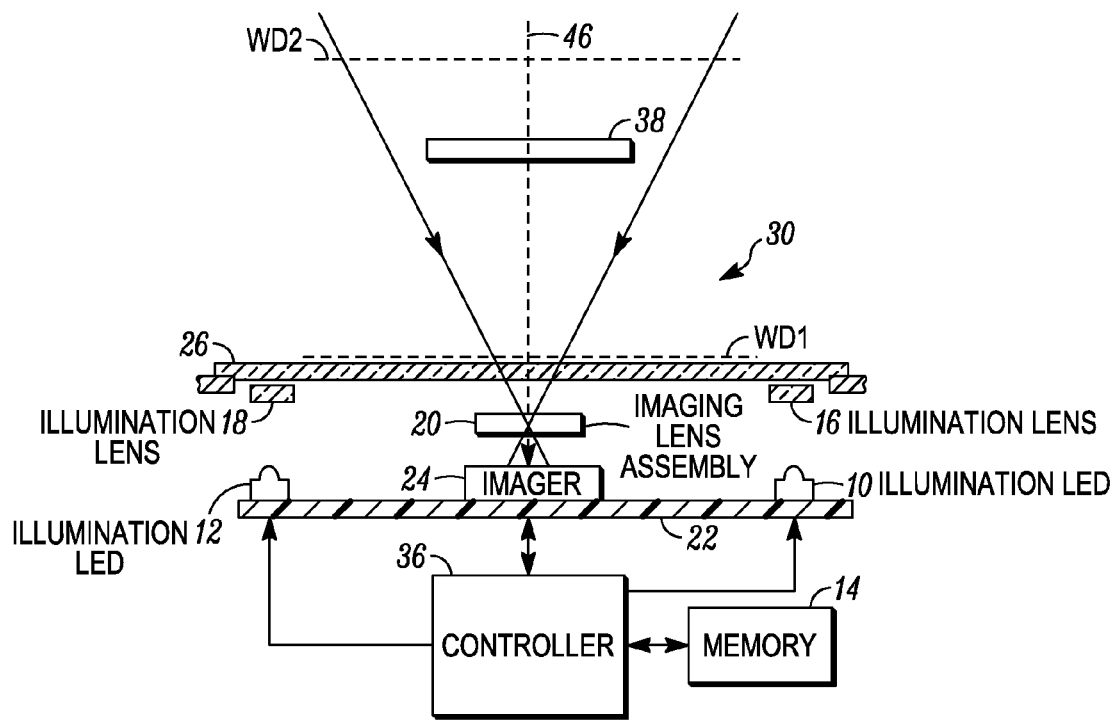
FIG. 2 is a schematic diagram of various components of the reader of FIG. 1.

As schematically shown in FIG. 2, an imaging system or module includes an imager 24 mounted on a printed circuit board (PCB) 22 in the reader 30. The PCB 22 is mounted within the tilted handle 28. The imager 24 is a solid-state device, for example, a CCD or a CMOS imager having a two-dimensional array of addressable image sensors or pixels arranged in mutually orthogonal rows and columns, and operative for detecting return light captured by an imaging lens assembly 20 along an imaging axis 46 through the window 26. The return light is scattered and/or reflected from a target 38 over the field of view. The field of view is generally perpendicular to the imaging axis 46.

The imaging lens assembly 20 is part of the imaging system and is operative for focusing the return light onto the array of image sensors to enable the target 38 to be read. The target 38 may be located anywhere in a working range of distances between a close-in working distance (WD1) and a far-out working distance (WD2). In a preferred embodiment, WD1 is about one-half inch from the window 26, and WD2 is about thirty inches from the window 26. The imaging lens assembly 20 is located remotely from the window 26, for example, over forty millimeters away.

An illuminating light assembly is optionally also mounted in the imaging reader and includes an illumination light source, e.g., at least one light emitting diode (LED), and preferably a plurality of LEDs, such as a pair of LEDs 10, 12, and a pair of lenses 16, 18 configured to generate a substantially uniform distributed illumination pattern of light on and along the target 38 to be read by image capture. At least part of the scattered and/or reflected return light is derived from the illumination pattern of light on and along the target 38.

As shown in FIG. 2, the imager 24 and the LEDs 10, 12 are operatively connected to a controller or microprocessor 36 operative for controlling the operation of these components. A memory 14 is connected and accessible to the controller 36. Preferably, the microprocessor is the same as the one used for processing the return light from the target 38.

In operation, the microprocessor 36 sends a command signal to energize the LEDs 10, 12 for a short exposure time period, say 500 microseconds or less, and energizes and exposes the imager 24 to collect the return light, e.g., illumination light and/or ambient light, from the target 38 only during said exposure time period. A typical array needs about 11-33 milliseconds to acquire the entire target image and operates at a frame rate of about 30-90 frames per second.

In accordance with one aspect of this invention, the microprocessor 36 is operative for automatically identifying a form having a plurality of form fields arranged at locations relative to one another, and for automatically identifying a correct orientation of the form whose image is being captured by the imaging assembly. Form templates, each template having a plurality of template fields arranged at locations relative to one another, are stored in the memory 14, either during manufacture, or during initial setup. The controller 36 matches the locations of the form fields in the captured image of the form with the locations of the stored template fields. Upon such matching, the controller 36 knows which form is being read, and where the form fields are, and what is the correct orientation in which to read the form fields. Thereupon, the controller 36 processes the form fields on the identified form in the correct orientation.

Figure 3:
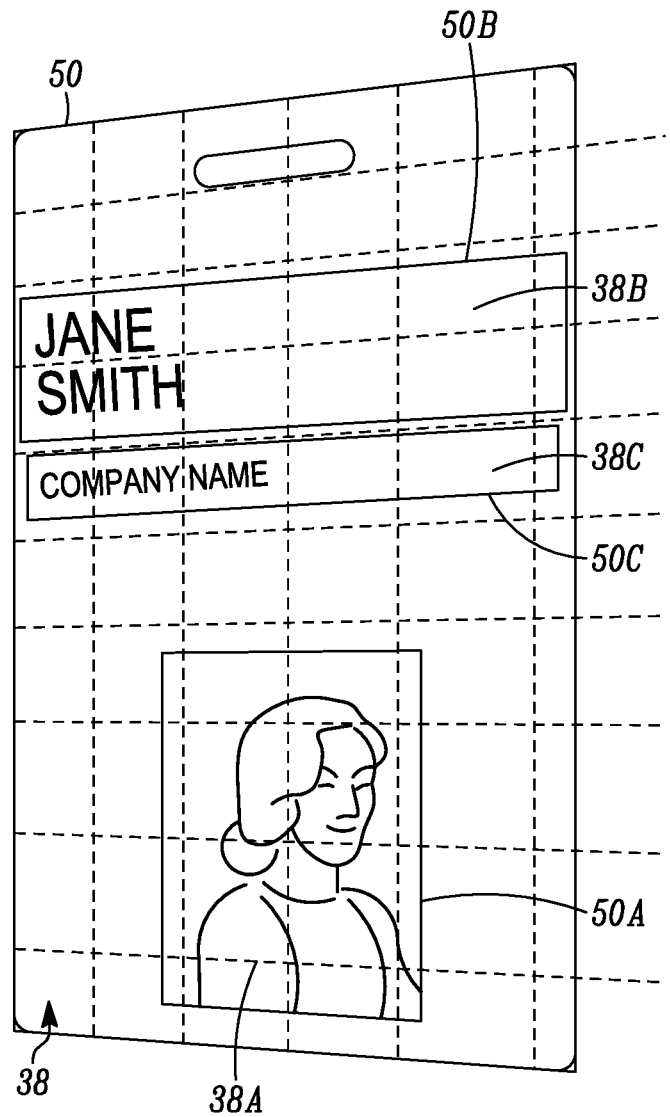
FIG. 3 is a captured image of an employee badge divided by a virtual grid model.

Turning now to FIG. 3, the target 38 is shown as an employee badge having a photograph of the employee in form field 38A, text identifying the employee's name in form field 38B, and additional text identifying the employer's name in form field 38C. Once the image of the badge 38 has been captured, the controller 36 outlines the entire form by drawing a quadrilateral virtual outline 50 around the entire form, thereby determining the size and the location of the form in the captured image.

Next, the controller 36 constructs a mathematical virtual grid model over the captured image, thereby allowing the form to be divided into an arbitrary number of quadrilateral zones, depending on the requirement specified in the form template. From the stored template fields, and using the grid model, the controller knows where the form fields 38A, 38B and 38C are expected to appear in the captured image. Each zone is assumed to contain more content inside (textual or graphical) than in its periphery. The controller 36 verifies the form fields by drawing a quadrilateral virtual outline 50A, 50B and 50C around the expected respective location of each form field 38A, 38B and 38C. The controller 36 measures, in a first measurement, the number of transitions or degrees of intensity variation within each form field, and measures, in a second measurement, the number of transitions or degrees of intensity variation at the peripheries of the form fields. The controller 36 compares the first and second measurements, and declares a verification successful if the first measurement is significantly larger than the second measurement. The form fields chosen for verification are such that they collectively do not exist in other forms in the same relative locations, or in the same form in more than one orientation.

Figure 5:
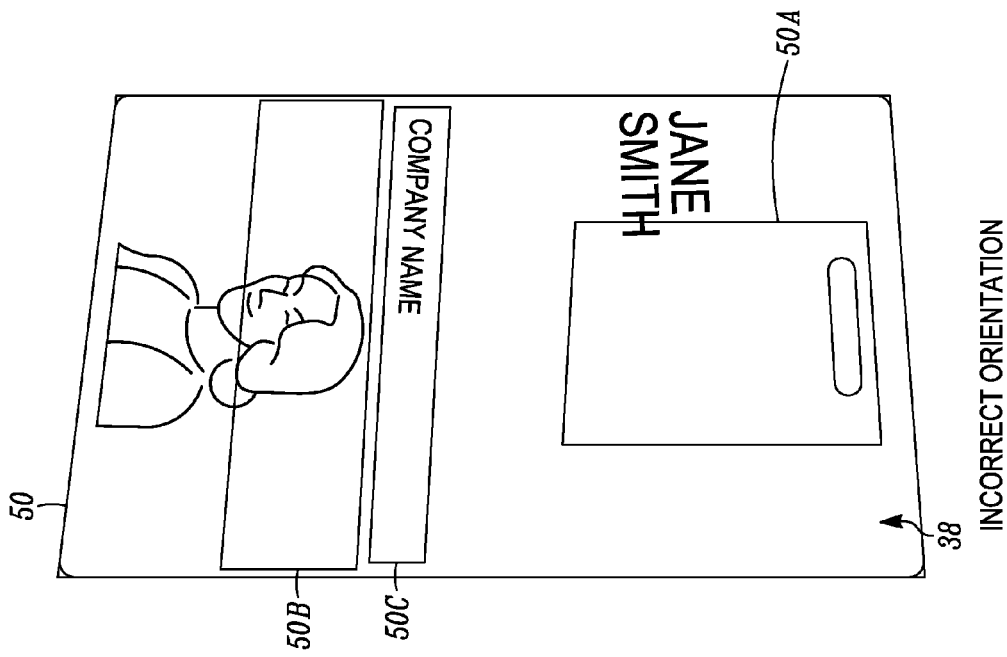
FIG. 5 is the badge of FIG. 3 showing various form fields in an incorrect orientation.
Figure 4:
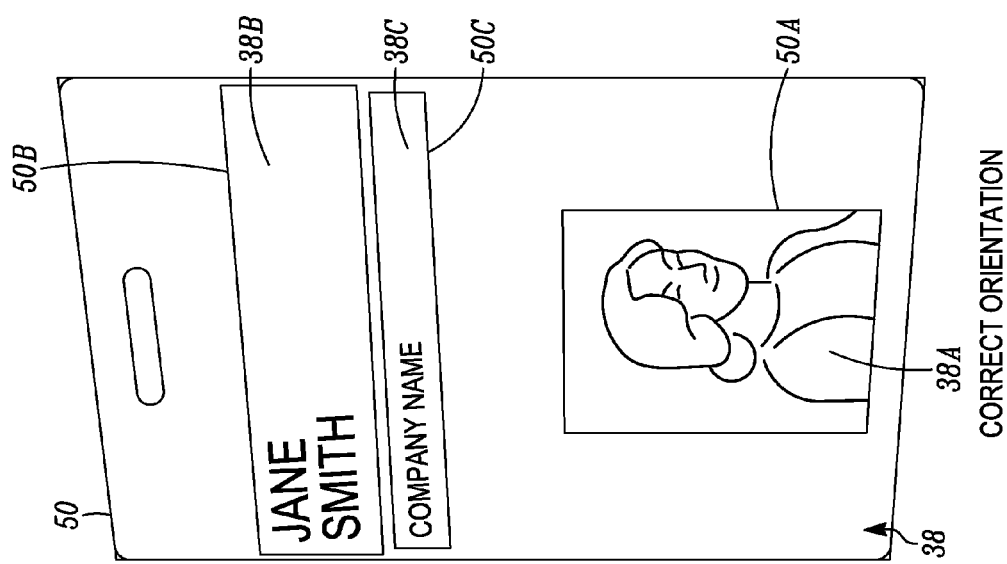
FIG. 4 is the badge of FIG. 3 showing various form fields in a correct orientation.

FIG. 4 depicts the form fields 38A, 38B and 38C in a correct orientation. FIG. 5 depicts the form fields 38A, 38B and 38C in an incorrect orientation. If at least one of the form fields is not found, e.g., as shown in FIG. 5, then the grid model is rotated so that the zones are tried in another orientation. This is repeated four times if the form is approximately square, or two times if there is some certainty that the form is not square (rectangular). Of course, four orientations can be tried regardless of the aspect ratio of the form, if the processing involved can be accomplished rather quickly.

Figure 6:
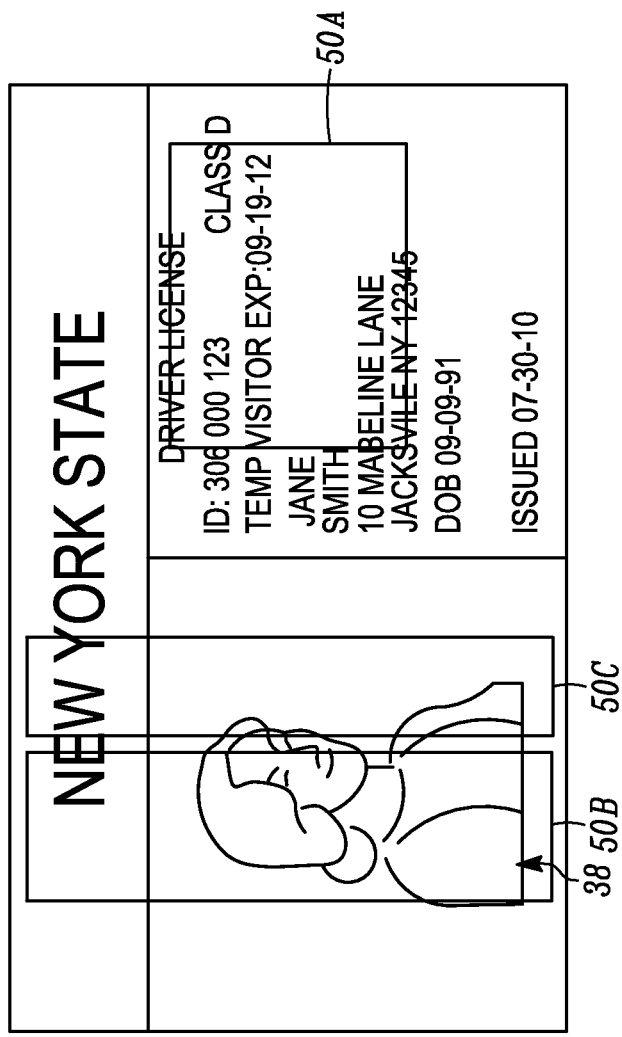
FIG. 6 is a driver's license showing various form fields in an incorrect orientation.

If at least one of the form fields is not found in any of the orientations, then the controller 36 may attempt to match the form being imaged with other templates in its memory 14. For example, see FIG. 6, which depicts a different form, i.e., a driver's license. If none of the templates are matched, or if any one of the form fields designed for a particular form are not verified, as shown in FIG. 6, then the controller 36 could refuse to further process the image, rather than potentially mis-identifying and mis-processing the form. If all the form fields designed for a particular form are verified in any orientation, then the form and its correct orientation is determined to have been found. According to the requirements of the user, further processing of the captured image may involve rectifying the complete form, brightening it and making it uniform, or similar processing of some of the form fields, which may or may not be the same as those used for form and form orientation identification. Other processing, such as optical character recognition (OCR), optical mark recognition (OMR), and intelligent character recognition (ICR), can be conducted on the rectified form, or form fields.

Figure 7:
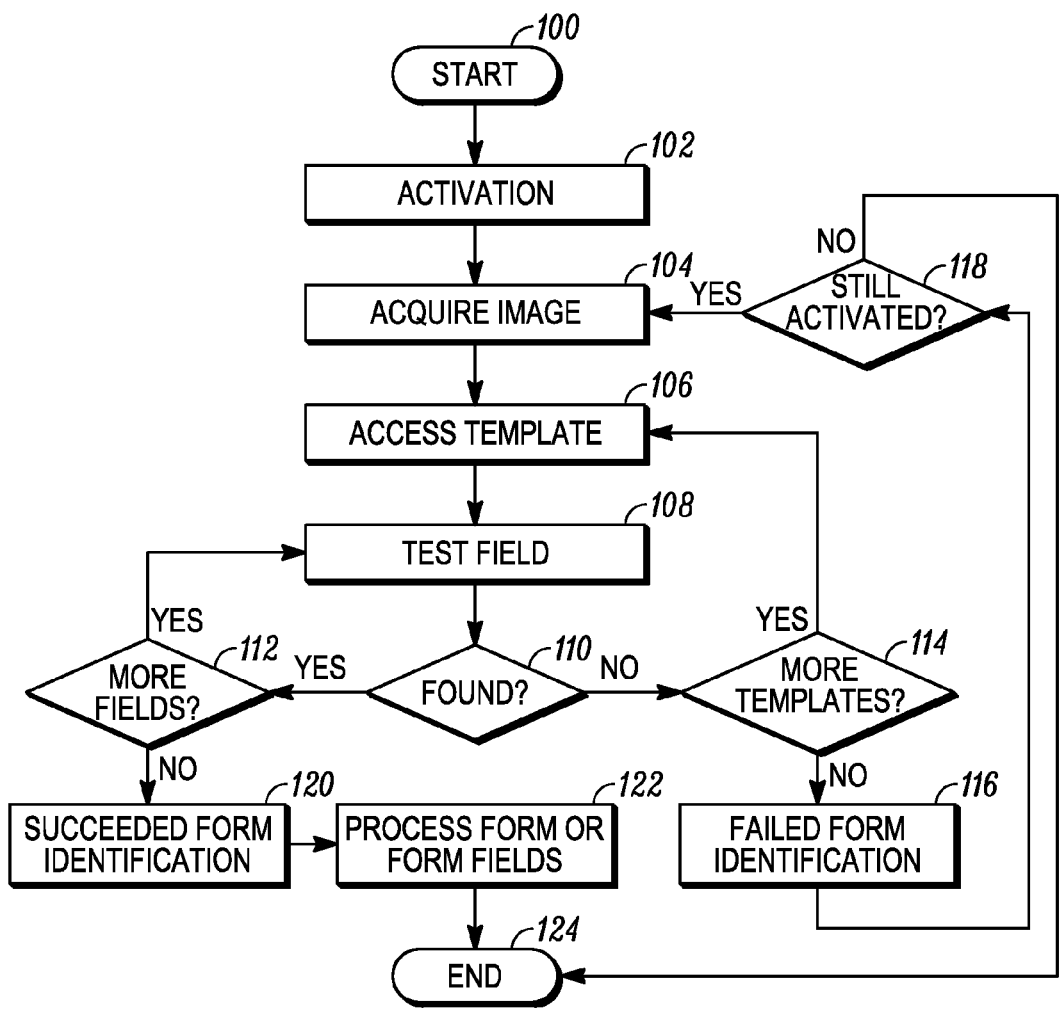
FIG. 7 is a flow chart depicting operation of a method in accordance with the present invention.

Turning to the operational flow chart of FIG. 7, a reading session begins at start step 100. Activation of reading is initiated by manually activating the trigger 34 in step 102. Alternatively, the trigger could be activated automatically by operation of an object sensing assembly. An image of the target is acquired by the imager 24 under control of the microprocessor 36 in step 104. The microprocessor 36 now loads and accesses a particular type of form template stored in memory 14 in step 106.

The microprocessor 36 now analyzes the captured image. If the image contains a bar code symbol, as determined in step 108, then the microprocessor 36 will attempt to decode the symbol in step 108, and then determine if the symbol is part of a form. If the symbol is not part of a form, then the results of a successfully decoded symbol are sent to a host computer. If the microprocessor 36 determines that the symbol is part of a form, then the microprocessor 36 checks to see if the symbol can indicate the correct orientation of the form.

If no symbol is found, then the microprocessor 36 tests the zones in step 108, as described above, to see if any particular zone contains more content inside (textual or graphical) than in its periphery. If a zone is found in step 110 to contain more content inside than outside the zone, then the microprocessor 36 will check in step 112 to see if there are any more such zones. If not, then the microprocessor 36 will check in step 114 whether or not there are any more form templates stored in the memory 14. If so, then the microprocessor 36 will return to step 106 and load and access another type of form template stored in memory 14. This process can be repeated for multiple form templates. If no more forms are available, then the microprocessor 36 will have failed to identify the form in step 116, and will check to see if the trigger is still activated in step 118. If so, then the image is acquired again in step 104. If not, then the reading session ends at step 124.

If no more zones are found in step 112, then the microprocessor 36 will have succeeded in identifying the form and its orientation in step 120. The microprocessor 36 processes the form fields in step 122, prior to the end of the reading session at step 124. Thus, the reading of forms is streamlined. For each reader activation, the microprocessor 36 will automatically identify the type of form being captured, and its correct orientation. The microprocessor 36 will then extract and recognize the data in each form field. The user need not switch modes during a reading session.

The arrangement and method described herein work with all forms and process images faster and simpler as compared with the known art, because the processing does not require the capturing of a rectified image, which is required in the known art. Further, the arrangement and method described herein allows the captured form not only to be in any perspective, but also to not go through an initial rectification step. In the case of a form that is unexpected, the arrangement and method described herein do not rectify the form at all. No OCR or orientation marks or margin detection are required at all. The arrangement and method described herein rely on each form having a preexisting format, with the form fields being located at known locations. The arrangement and method described herein work well with forms that contain a complex background, such as those on certain official documents (drivers' licenses, etc.), because the arrangement and method described herein compares the variation within a zone with the variation outside the zone, and, as a result, it does not matter if the background is busy.

In the foregoing specification, specific embodiments have been described. However, one of ordinary skill in the art appreciates that various modifications and changes can be made without departing from the scope of the invention as set forth in the claims below. For example, the arrangement described herein is not intended to be limited to a stand-alone electro-optical reader, but could be implemented as an auxiliary system in other apparatus, such as a computer or mobile terminal. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An arrangement for electro-optically reading forms, each form having a plurality of form fields arranged at locations relative to one another, by image capture, comprising:
    a housing;
    a memory for storing form templates, each template having a plurality of template fields arranged at locations relative to one another;
    an imaging assembly supported by the housing, for capturing images over a field of view; and
    a controller operative for automatically identifying a form and a correct orientation of the form whose image is being captured by the imaging assembly, by matching the locations of form fields in the captured image of the form with the locations of stored template fields and by matching at least one more time the locations of the form fields in the captured image of the form with the locations of the stored template fields in a new orientation after turning the captured image when the locations of the form fields in the captured image do not match the locations of the stored template fields, and further operative for processing the form fields on the identified form in the correct orientation.

2. The arrangement of claim 1, wherein the housing has a handle for handheld operation, and a trigger supported by the handle for activating the reading.

3. The arrangement of claim 1, wherein the imaging assembly includes a solid-state imager having an array of image sensors, and an imaging lens for focusing the captured image onto the array.

4. The arrangement of claim 1, wherein the array is two-dimensional.

5. The arrangement of claim 1, and a trigger supported by the housing, for activating the reading, and wherein the controller is operative for automatically identifying the form and the correct orientation of the form in response to activation by the trigger.

6. The arrangement of claim 1, wherein the controller is operative for identifying a size and the location of each of the form fields in the captured image of the form, and for separately processing data in each form field.

7. The arrangement of claim 6, wherein the controller is operative for recognizing the data by applying one of optical character recognition (OCR), optical mark recognition (OMR), and intelligent character recognition (ICR).

8. The arrangement of claim 1, wherein the controller is operative for determining a size and a location of the form, and for determining a size and the location of each form field relative to those of the form to identify the form being imaged.

9. The arrangement of claim 1, wherein the controller is operative for determining a size and the location of each of the form fields in the captured image of the form.

10. A method of electro-optically reading forms, each form having a plurality of form fields arranged at locations relative to one another, by image capture, comprising:

storing form templates, each template having a plurality of template fields arranged at locations relative to one another;

capturing images over a field of view;

automatically identifying a form and a correct orientation of the form whose image is being captured, by matching the locations of the form fields in the captured image of the form with the locations of the stored template fields and by matching at least one more time the locations of the form fields in the captured image of the form with the locations of the stored template fields in a new orientation after turning the captured image when the locations of the form fields in the captured image do not match the locations of the stored template fields; and processing the form fields on the identified form in the correct orientation.

11. The method of claim 10, wherein the capturing is performed by a solid-state imager having an array of image sensors, and focusing the captured image onto the array.

12. The method of claim 11, and configuring the array as a two-dimensional array.

13. The method of claim 10, and activating the reading by a trigger, and wherein the automatically identifying the form and the correct orientation are performed in response to activation by the trigger.

14. The method of claim 13, and mounting the trigger on a housing, and wherein the trigger is activated while holding the housing in a user's hand.

15. The method of claim 10, and identifying a size and the location of each of the form fields in the captured image of the form, and separately processing data in each form field.

16. The method of claim 15, and recognizing the data by applying one of optical character recognition (OCR), optical mark recognition (OMR), and intelligent character recognition (ICR).

17. The method of claim 10, and determining a size and a location of the form, and determining a size and the location of each form field relative to those of the form to identify the form is being imaged.

18. The method of claim 10, and determining a size and the location of each of the form fields in the captured image of the form.

* * * * *